Aug. 7, 1928.

J. I. HAASE 1,679,569

SKIVING MACHINE

Filed Sept. 29, 1925    2 Sheets-Sheet 1

INVENTOR
Jorgen I. Haase,

BY

ATTORNEY

Aug. 7, 1928.

J. I. HAASE

SKIVING MACHINE

Filed Sept. 29, 1925    2 Sheets-Sheet 2

1,679,569

Inventor
Jorgen I. Haase,

Attorney

Patented Aug. 7, 1928.

1,679,569

UNITED STATES PATENT OFFICE.

JORGEN I. HAASE, OF AKRON, OHIO, ASSIGNOR TO THE GOODYEAR TIRE & RUBBER COMPANY, OF AKRON, OHIO, A CORPORATION OF OHIO.

SKIVING MACHINE.

Application filed September 29, 1925. Serial No. 59,278.

My invention relates to skiving machines, and more particularly, it relates to a machine adapted to cut resilient material such as cold solid rubber tire treads.

Solid tires are commonly assembled by rolling, onto a steel rim or base band, a straight piece of unvulcanized rubber, the ends of which have been cut at an angle in order to form a lap joint. Heretofore, the ends of the tread have been skived by hand, but this operation is unsatisfactory, for it is difficult to cut cold rubber with hand tools. Manual cutting of the heavy tread sections employed on large sizes of tires is a tedious and slow operation, and one which can be performed with any degree of satisfaction only by skilled labor.

It is the object of the invention to provide a machine by means of which the ends of solid tire treads may be easily skived at the desired angle.

Figure 1:
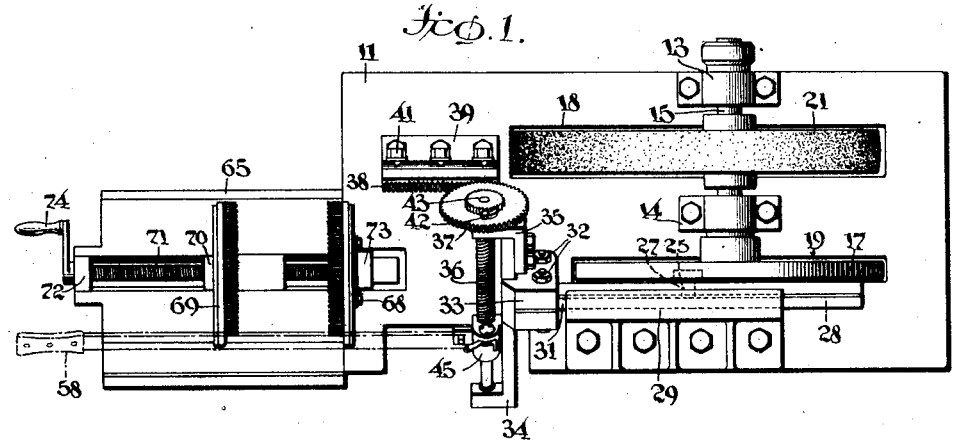
Fig. 1 is a plan view of a machine embodying the principles of my invention.
Figure 2:
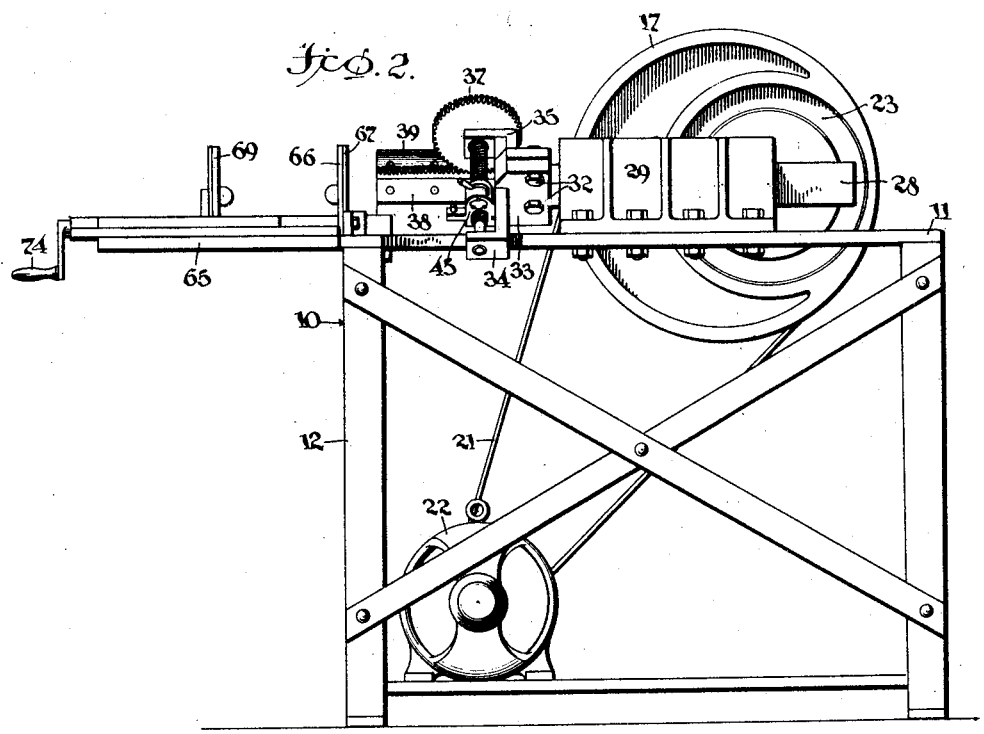
Fig. 2 is a side elevational view of the machine.
Figure 3:
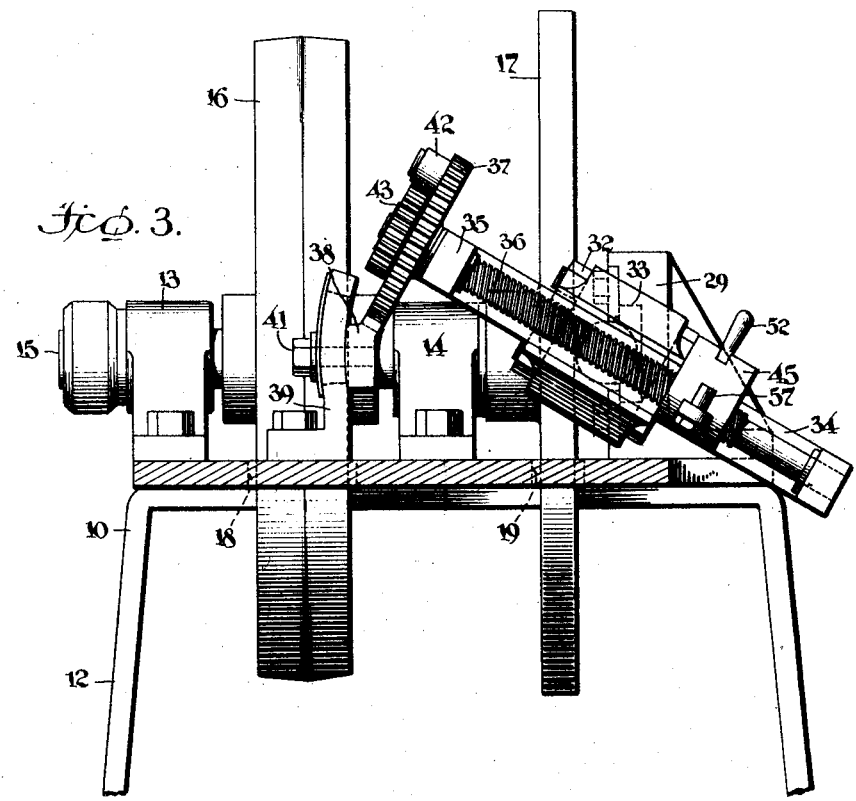
Fig. 3 is a fragmentary end elevational view, drawn on a larger scale, and partially in section.

In a broad aspect, the illustrated embodiment of the invention comprises a frame on which is mounted a reciprocating slide, which carries a knife or cutting tool disposed at an angle to a tread placed on the frame. Means are provided to advance the knife periodically as the slide is reciprocated, in order to insure a clean cut of the material.

More specifically, the machine comprises a frame, indicated generally by the reference numeral 10, having a deck 11 supported by a suitable substructure 12. Bearings 13 and 14, positioned on the deck 11, support a shaft 15, to which is keyed a driving pulley 16 and a cam wheel 17, which project through suitable apertures 18 and 19, respectively, provided in the deck 11. The shaft may be rotated by means of a suitable drive 21, extending from the pulley 16 to a motor 22. It is preferable to provide means whereby the speed of the motor, and hence that of the machine, may be varied in accordance with the weight of stock which is to be cut. This may be done in practice by employing a variable speed motor.

The cam wheel 17 is provided with an eccentrically disposed annular channel 23, of sufficient width to receive the outer race ring of an antifriction bearing 25. The inner race ring of the bearing is fixed to a pin 27, which projects from a slide 28, mounted for straight line movement in a block 29, secured to the deck 11 of the frame 10. As the shaft 15 revolves with the cam wheel 17, the annular channel 23 travels about the bearing 25, and thus provides an efficient means to reciprocate the slide 28 with a straight line motion in the block 29.

The outer end of the slide 28 is provided with a reduced cylindrical portion 31 upon which is secured, by suitable bolts 32, a bracket 33, having an integral angular portion 34 and a detachable angular member 35. The portions 34 and 35 are provided with step and neck bearing bushings respectively, in which is mounted for rotation a spirally grooved or screw-threaded rod 36. A gear 37, loosely mounted on the rod 36 adjacent the bracket 35, meshes with a rack 38, mounted on the deck 11.

The block 39, upon which the rack is mounted, is provided with elongate slots which receive suitable screws 41 securing the parts in fixed relation. A pawl 42, pivotally mounted on the gear 37, engages a ratchet 43, keyed to the rod 36. As the slide 28 is actuated, the gear 37 is caused to rotate, by virtue of its engagement with the rack 38. During the forward part of the stroke, the pawl 42 slips over the teeth of the ratchet 43, but upon reversal of the motion, the pawl engages the teeth, causing the ratchet and rod 36 to rotate. It will be noted that the angular relation of the member 33 with respect to the plane of the deck 11 may be varied, by loosening the screws 32, and turning the bracket about the reduced portion 31 of the slide 28, to the desired position. The rack 38 may also be adjusted to engage always with the gear 37, by loosening the screws 41 and sliding them along the slots provided in the block 39.

A knife support 45 is positioned on the rod 36 and is free to slide therealong as the rod is rotated. Simultaneous rotation of the support is prevented by providing it with a plane face 46 which abuts the member 33. A predetermined movement along the rod, depending upon the pitch of the thread, is imparted to the support 45 upon each alternate half stroke of the slide 28. It is desirable to cut the individual slabs of tread stock always in the same direction, and accordingly, the support 45 is so constructed that it may be restored to its original position without rotation of the rod 36.

Figures 4, 5:
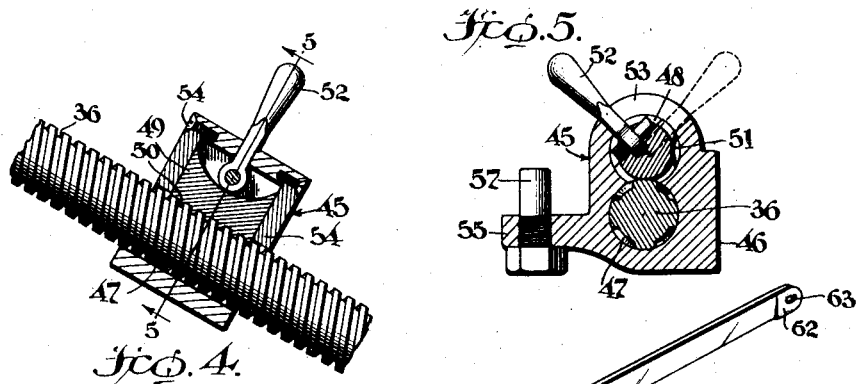
Fig. 4 is a detail view in cross-section of one element of the machine.
Fig. 5 is a cross-sectional view taken on the line 5—5 of Fig. 4.

The support is accordingly provided with a longitudinal channel 47 through which the spirally grooved rod 36 passes, and a channel 48, which is adapted to receive a post 49 provided with screw threads 50, having the same pitch as the spiral on the rod 36, and an arcuate slot 51. The post is so positioned in the support 45 that the threads of the rod 36 and post 49 are normally intermeshing, as indicated in Fig. 4. The threads in the post may be disengaged from the spiral on the rod 36 by rotating a lever 52, fixed in the post 49 and projecting through an aperture 53 in the support, so that the arcuate slot 51 is adjacent the spiral. When the parts are in this position, the support is free to slide along the rod 36 without rotation thereof. Plates 54 are secured to the block 45 and provide a means to hold the post in position.

Figure 6:
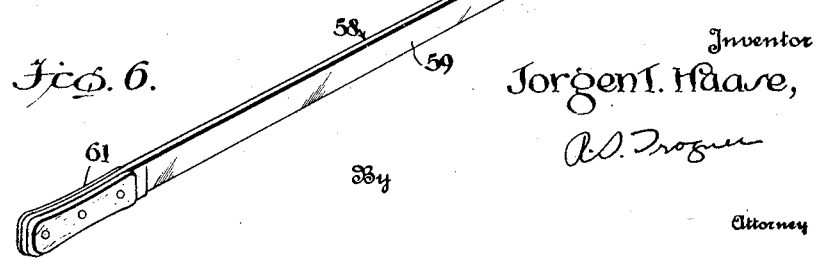
Fig. 6 is a perspective view of the cutting knife.

A lug 55, to which is secured a pin 57, projects from the block 45, and provides a connection for the cutting knife 58, shown in Fig. 6. The knife consists of a blade 59 having a handle 61 at one end thereof, and at the other a lug 62, provided with an aperture 63 adapted to fit over the pin 57.

The deck 11 of the frame 10 has a projecting table 65, provided with clamping and guiding means adapted to hold the tire tread in proper relation with respect to the knife. This means comprises an upright member 66, secured to the table 65 and provided with a portion 67 pivoted thereto by means of a bolt 68. A second similarly constructed upright jaw 69 is mounted for movement along the table by means of a threaded lug 70 engaging a screw 71, supported in bearings 72 and 73 positioned in the table 65. A handle 74 is provided at the outer end of the screw, to afford a simple means for rotating it and moving the jaw 69 to and from the jaw 66. The pivoted portions 67 of the jaws 66 and 69 form a guiding surface for the knife 58, and they may be rotated until they make the same angle with the table 65 as the member 33 makes with the deck 11.

In operation, the member 33, and guides 67 are set at the angle (usually 30 degrees) at which it is desired to skive a tread section. The material is brought between the jaws 66 and 69, preferably by means of a conveyor, and is then clamped by turning the handle 74. The knife support 45 is moved to the upper end of the rod 36, and the knife 58, which preferably has been lubricated, is connected to the pin 57. The blade of the knife is inclined at the proper angle to the tread section, inasmuch as it rests against the guides 67. When the shaft 15 is rotated, reciprocating straight line movement is imparted to the knife by the motion of the slide 28. At each alternate half stroke, the knife is advanced a predetermined distance and hence is always in proper cutting position. The operator has only to hold the handle of the knife, and need exert no force to skive the tread.

It will be apparent from the foregoing description that a machine is provided by means of which the ends of solid tire sections may be rapidly and properly skived. While a preferred embodiment of the machine has been described in detail, it is to be understood that the principles of the invention are capable of modifications and adaptations. It is intended, therefore, that the invention shall be limited only by the scope of the following claims.

What I claim is:

1. A skiving machine comprising a frame having a slide mounted thereon for reciprocatory motion, a bracket supporting a threaded rotatable rod adjustably secured to the slide, a knife supporting member mounted for movement on the rod, a knife secured to the supporting member, a gear loosely mounted on the rod, a rack mounted on the frame engaging the gear; a ratchet keyed to the rod and a pawl pivoted on the gear and engaging the ratchet, whereby the rod will be rotated during only part of the motion of the slide.

2. A skiving machine comprising a frame having a slide mounted thereon for reciprocatory straight line motion, a bracket supporting a threaded rotatable rod secured to the slide, a rack and a ratchet mechanism associated with the frame and the rod to impart rotation to the rod during part of the stroke of the slide, a knife support mounted on the rod and adapted to be moved as the rod is rotated, a knife secured to the support, and means associated with the support to disengage it from operative position with respect to the rod.

3. A machine for skiving solid rubber tire treads, comprising an adjustable clamping member adapted to secure a tread in position, means associated with the clamp to determine the angle at which the tread shall be cut, a reciprocating member, a knife secured thereto and carried back and forth across the tread thereby, means associated with the reciprocating member to advance the knife in its own plane, a predetermined distance for each successive stroke of the reciprocating member and means permitting the return of the knife to its original position after the tread has been skived.

4. A machine for cutting tire stock comprising a knife, means to reciprocate the knife in a line approximately parallel to the edge thereof, means to vary the angle of the knife with respect to the stock about an axis approximately parallel to the line of reciprocation of the knife, and means to advance the knife in a direction perpendicular to its line of reciprocation.

5. A machine for skiving tread stock comprising a fixed frame, means for securing tread stock to the frame, a reciprocating slide secured upon the frame, a screw-threaded spindle journalled upon the slide, a knife holder engaging the threads of the spindle, a knife secured to the knife holder, a gear upon one extremity of the spindle, a rack bar engaging the gear, a ratchet mechanism associated with the gear to insure rotational movement of the gear in a single direction, and means for reciprocating said slide.

6. A machine for skiving rubber tire tread stock comprising a support, means for clamping tread stock to said support, a tiltable slide secured to the support, a screw-threaded spindle journalled upon the slide, a gear upon one end of the spindle, a rack bar secured to the top of the support and engaging the gear, means permitting vertical movement of the surface of the rack bar, whereby to secure angular adjustment of the slide, means including a ratchet for securing rotational movement of the spindle in a single direction, a knife holder engaging the screw threads, a knife secured to the holder, and means for reciprocating the slide.

7. A machine for skiving rubber tire stock comprising a fixed table top, means for clamping tire stock upon the top, a knife supporting carriage slidably mounted upon the table top, means for reciprocating the carriage, a knife secured to the carriage, means for advancing the knife in a direction perpendicular to the direction of reciprocation, and means for varying the angle of inclination of the carriage about an axis parallel to the line of reciprocation.

In witness whereof, I have hereunto signed my name.

JORGEN I. HAASE.